United States Patent Office 3,108,765
Patented Oct. 29, 1963

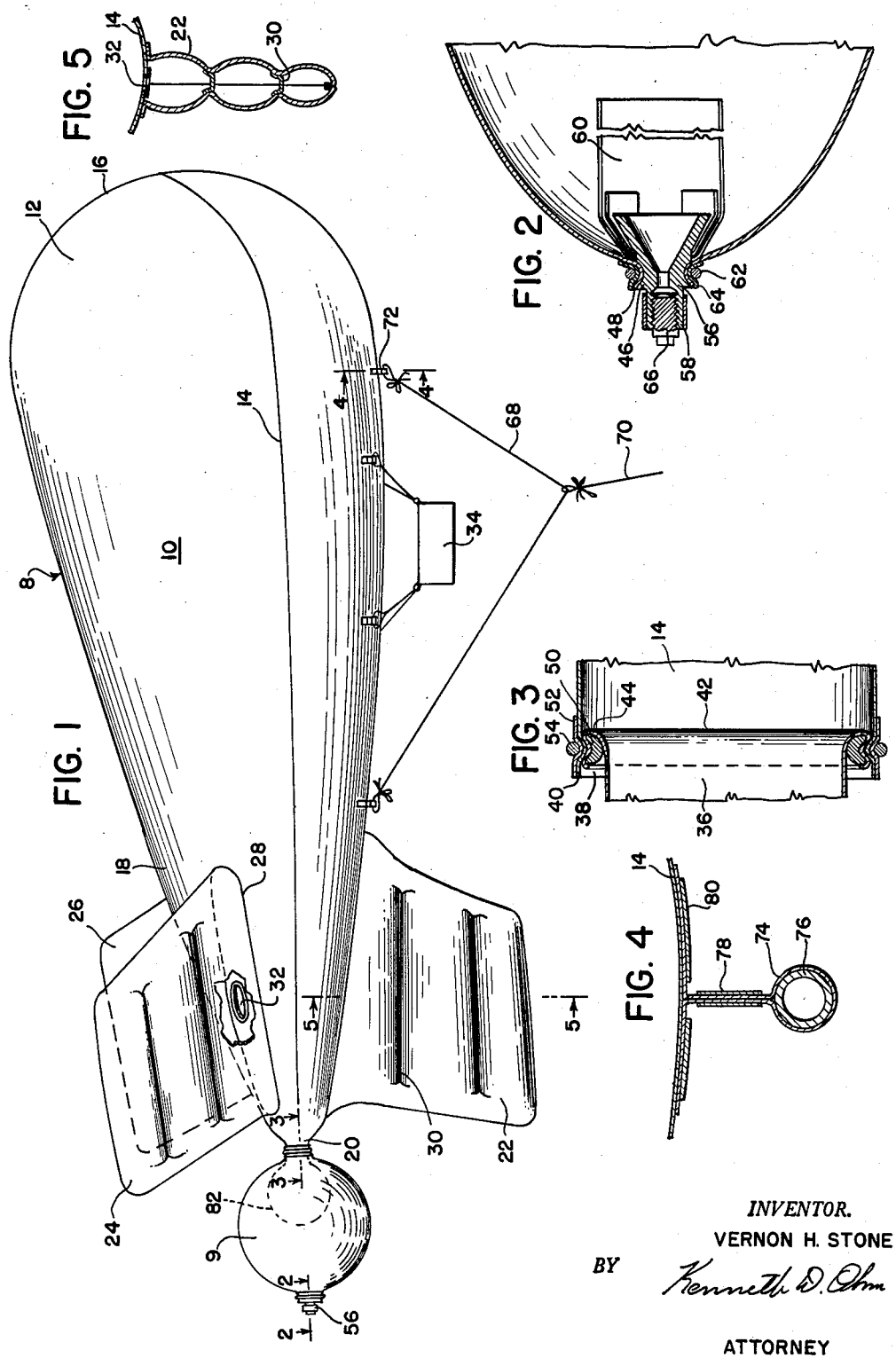

3,108,765
BALLOON HAVING AN EXTERNAL BALLONET
Vernon H. Stone, St. Paul, Minn., assignor to General
Mills, Inc., a corporation of Delaware
Filed Jan. 18, 1960, Ser. No. 3,124
6 Claims. (Cl. 244—31)

The present invention relates to balloons, and more particularly to balloons having a substantially constant volume gas envelope and an expandable external ballonet for maintaining a predetermined pressure within said gas envelope while said balloon is aloft.

Some balloons have a substantially constant volume gas envelope which is made of a non-elastic material and which is not free to expand or contract as the gas pressure within said envelope changes. In other words, as the gas pressure within the envelope increases or decreases, due to ambient temperature changes, ambient pressure changes, diffusion of gas through the envelope membrane, and the like, the volume of the gas envelope will undergo little or no corresponding change in size. Often the gas envelope in such a balloon is reinforced with tapes, a non-expansible shroud or the like; such means may include a valve for permitting the lifting gas, if it expands, to be valved out of the envelope to thereby prevent said envelope from bursting.

In an expansible type balloon, the gas envelope may be made of an elastic material which will expand or contract as the gas volume within said envelope increases or decreases. Such an expansible balloon will remain pressurized but is unsatisfactory in many respects since it will deform in high winds and generally has unsatisfactory aerodynamic characteristics.

The above conditions are generally true whether the balloon is a free balloon or a captive balloon; whether it is a spherical balloon, or a balloon having a different shape. Generally speaking, a free balloon is one which is capable of lifting a payload and ascending freely into the atmosphere with the load suspended beneath it, and it is free to move with air currents. A captive balloon, on the other hand, is kept tied or tethered with a line so that its ascent is under complete control at all times, and it is not free to move with the air currents.

One means of maintaining a predetermined pressure within a constant volume balloon envelope is to provide said envelope with two compartments. A first compartment for containing gas and a second compartment or ballonet for containing air. Said compartments are located within said envelope. There is no means provided for gas or air to flow between said compartments. The air compartment or ballonet is adapted to expand or contract as the gas volume within the gas or first compartment of said envelope decreases or increases respectively. In such cases the gas compartment of said envelope is inflated with a lifting gas such as helium and the ballonet is adapted to be filled with air from the atmosphere through an appropriate opening in the ballonet. As the gas volume within said gas compartment changes air is forced into or out of the ballonet through the opening to compensate for said gas volume change. For example if the gas volume decreases air will be forced into the ballonet; and if the gas volume increases air will be forced out of the ballonet. The volume of the balloon envelope in such instances will remain substantially constant at all times and the pressure will be maintained at a predetermined magnitude. To the best of my knowledge the prior art does not show a ballonet externally located relative to a non-elastic balloon gas envelope for maintaining a predetermined pressure within said non-elastic envelope.

Accordingly one object of the invention is to provide a non-elastic balloon envelope having an external control for maintaining a predetermined pressure within said balloon envelope.

Another object is to provide an external inflatable control for maintaining a predetermined pressure within a balloon envelope.

A further object is to provide an external inflatable control for maintaining a predetermined pressure within a constant volume captive balloon envelope.

A still further object is to provide an inflatable external control which is associated with and inflatable from a non-elastic balloon envelope said control maintaining a predetermined pressure within said balloon envelope.

Other objects and advantages of the invention will become apparent from a consideration of the following specification and accompanying drawings in which:

FIGURE 1 is a side elevation of a constant volume captive balloon including an elastic external ballonet according to my invention;

FIG. 2 is a sectional view taken along line 2—2 of FIG. 1;

FIG. 3 is a sectional view taken along line 3—3 of FIG. 1;

FIG. 4 is a sectional view taken along line 4—4 of FIG. 1;

FIG. 5 is a sectional view taken along line 5—5 of FIG. 1.

Referring to FIG. 1 a balloon 8 comprised of a substantially constant volume gas envelope 10 and an external ballonet 9 is illustrated. Gas envelope 10 is illustrated as being a small aerodynamic structure which is flown in a captive state and is used to carry lighter payloads such as instruments, antennas and the like. Envelope 10 is made of a substantially non-extensible material such as polyethylene and is filled with a lifting gas such as helium. Said envelope 10 is comprised of a plurality of gores 12 which are joined together at their respective perimeters 14. Said envelope has a front hemispherical nose portion 16 and a rear cone-shaped tail portion 18.

Located at the apex 20 of the tail 18 are a plurality of inflatable fins 22, 24 and 26. Said fins are used to impart aerodynamic and free lift and also to stabilize the structure by maintaining the balloon in the proper attitude of flight. Said fins are spaced about the periphery of the tail 18 of envelope 10 and are joined to the gas envelope 10 along lines such as 28. Fin 22 extends radially in a vertical direction relative to the longitudinal axis of the envelope 10 and fins 24 and 26 extend radially at an acute angle relative to a horizontal plane through said longitudinal axis. Fin 22 acts as a rudder and prevents lateral deflection or side drift. Fins 24 and 26 prevent rolling, plunging, or other deflections of the balloon 8. My embodiment will maintain a high angle of attack to the horizontal, it will climb into the wind as the wind velocity increases, and it will maintain a stable position for a payload, which may be suspended below the balloon.

The fins are constructed of material such as polyethylene, and are inflated from the gas envelope 10 through reinforced openings 32, between the gas envelope and the fins. Substantially the same pressure is therefore maintained in the fins as in the gas envelope. Each fin is reinforced by providing a plurality of internal ribs 30 as shown in FIG. 1 and more particularly in FIG. 5. Said ribs 30 add rigidity to the fin and aid in maintaining the proper shape of said fin. Said ribs do not extend completely to the forward and rear edges of the fin, therefore gas can flow freely within the fin to completely inflate it.

Suspended below the balloon 8 is a load 34, which might be instruments of various types, an antenna, or the like.

Attached to the apex 20 of the balloon is the ballonet 9 which is inflatable. Said ballonet is made of an elastic material such as rubber, and is shown in an inflated condition in FIG. 1. Said ballonet is used to maintain a predetermined pressure within the gas envelope 10. Ballonet 9 is attached to the apex 20 of the balloon as shown in FIG. 3. Apex 20 is provided with a circular opening or mouth 38 which has a lip 40. The ballonet 9 is provided with two open ends; a first open end 42 which has a lip 44, and a second open end 46, which has a lip 48. Lip 44 partially encircles a circular band 50. Said band is inserted within the opening 38 of apex 20 so that the gore 14 is superimposed over the lip 44. Tape 52 is peripherially wound around the apex 20 as shown in FIG. 3, and the ballonet and apex are clamped together by ring 54.

Inserted within the second opening 46 of the ballonet is a valve designated generally by reference numeral 56. Valve 56 is provided with an inlet 58 and a diffuser 60. Diffuser 60 is provided to aid in proper inflation and to prevent injury to the material during inflation. Said valve is secured to the ballonet by ring 62. Inserted between the ring 62 and the ballonet 36 is tape 64. Said tape protects the ballonet material from wear caused by the ring 62. Plug 66 may be threadedly inserted within inlet 58, and will prevent gas from escaping through the inlet 58.

A two-point bridle 68 is used as a couple between the balloon and the captive line 70. Said bridle is secured to the balloon at 72. A more detailed view of the point of attachment is shown in FIG. 4. Tape 74 encircles a short tube 76 and is adhesively secured to the balloon material. Tube 76 may be constructed of metal, plastic or the like. Tapes 78 and 80 are provided to reinforce tape 74 and to provide a more secure attachment to the balloon material.

The gas envelope 10 is inflated with a lifting gas while the balloon is on the ground, prior to its ascent. Plug 66 is removed from the inlet 58 of valve 56 and gas is injected into the ballonet. Gas flows through the ballonet 9 into the gas envelope 10. As the gas envelope is inflated through the opening in the apex, gas is transmitted from the envelope 10 into the fins through the reinforced opening 32 between the gas envelope and the fin. When a predetermined pressure has been reached within the gas envelope, plug 66 is replaced within the inlet 58, the load attached to the underside of the balloon 8, and the balloon permitted to ascend into the atmosphere.

While the balloon is near the ground, the pressure within the gas envelope 10 and the ballonet 9 will be substantially equal, and the ballonet will assume an inflated condition similar to that shown in broken line in FIG. 1. (Note reference numeral 82.) As the balloon ascends the ambient pressure decreases. Therefore, the gas within the balloon will tend to expand. Since the balloon is comprised of a gas balloon envelope made of substantially non-elastic material, the volume of said envelope will remain constant and the gas will, therefore, expand into the expansible rubber ballonet 9, and a rupture of the gas envelope will be prevented.

I have found that while a balloon is aloft, the volume of the gas therein tends to increase and/or decrease. For example, said volume increase might be caused by an ambient temperature increase; and said volume decrease might be caused by loss of gas from the envelope by leakage through improper seals, diffusion through the envelope membrane, ambient temperature decreases or the like. These tendencies of the gas volume within a balloon to change might cause a non-extensible balloon envelope, such as 10, to burst or deform if means are not provided to compensate for the increase or decrease of said gas volume. I have found that by providing a balloon 8 with a non-extensible gas envelope 10 and with an inflatable ballonet 9 externally located relative to the envelope 10 and arranged to communicate therewith, that the pressure within the envelope 10 remains substantially constant because as the gas volume within the balloon increases, the gas will expand into the inflatable elastic ballonet 9 and as said gas volume decreases, the gas will be forced from said ballonet back into said envelope. That is, the invention set forth herein prevents such deformation or bursting of the non-extensible envelope 10.

In the above description and attached drawings a disclosure of the principles of this invention is presented, together with some of the ways in which the invention may be practiced.

Now, therefore, I claim:

1. A captive balloon comprising in combination a first gas bag for containing a lifting gas, said gas bag being relatively non-elastic, a second gas bag, said second gas bag being relatively elastic, said second bag located externally of said first bag, and means providing an unrestricted passage for the lifting gas to flow freely and continuously from said first bag into said second bag in response to a relative pressure increase within said first bag as compared to the external atmospheric pressure, and from said second bag into said first bag in response to a relative pressure decrease within said first bag.

2. A balloon comprising in combination a substantially non-elastic gas envelope for containing a lifting gas, said envelope having a tapered tail portion, a plurality of stabilizing means attached to said tail portion, inflatable elastic means located externally of said envelope for maintaining a predetermined pressure within the gas envelope, and means providing a passage for unrestricted movement of lifting gas from said envelope into said elastic means in response to a relative pressure increase within said envelope, and from said elastic means into said envelope in response to a relative pressure decrease within said envelope.

3. A captive balloon comprising in combination a main body portion having a substantially non-elastic lifting gas envelope with a desired external shape to be maintained, elastic lifting gas reservoir means for maintaining the predetermined shape of said gas envelope, said elastic reservoir means being externally located relative to the non-elastic lifting gas envelope and thereby exposed to ambient atmospheric pressure, and means connecting said reservoir means to the gas envelope, said means providing an unrestricted passage for direct communication between the interior of said reservoir means and the interior of said gas envelope, thereby maintaining the desired envelope shape by permitting free and continuous flow of lifting gas between the gas envelope and the reservoir means in response to expansion and contraction of the reservoir means due to relative changes in the pressure differential between the interior of the gas envelope and the atmosphere.

4. A balloon assembly comprising a substantially non-extensible envelope having a longitudinal axis, for containing a lifting gas, a resiliently extensible chamber located externally of said envelope for aiding in maintaining the shape of said envelope, and means providing a passage for unrestricted movement of lifting gas between said envelope and said chamber, said chamber providing extensible means for receipt of gas from said envelope in response to increased relative pressure within said envelope and providing means for forcing gas into said envelope in response to decreased relative pressure within said envelope.

5. The combination of claim 4 wherein the envelope has a streamlined shape with reference to said longitudinal axis, and said chamber is located substantially on said axis.

6. The combination of claim 5 wherein the balloon assembly includes a plurality of stabilizing fins radially projecting from said envelope so as to be substantially perpendicular to said longitudinal axis.

References Cited in the file of this patent
UNITED STATES PATENTS

| | | |
|---|---|---|
| 907,992 | Grube | Dec. 29, 1908 |
| 1,056,791 | Von Hoffman | Mar. 25, 1913 |
| 1,686,646 | Upson | Oct. 9, 1928 |
| 2,687,541 | Bannister | Aug. 31, 1954 |